UNITED STATES PATENT OFFICE.

HAROLD R. MURDOCK, OF NAUGATUCK, CONNECTICUT, ASSIGNOR TO RUBBER REGENERATING COMPANY, A CORPORATION OF INDIANA.

PROCESS OF RECLAIMING RUBBER.

1,189,282. Specification of Letters Patent. Patented July 4, 1916.

No Drawing. Application filed August 10, 1915. Serial No. 44,732.

*To all whom it may concern:*

Be it known that I, HAROLD R. MURDOCK, a citizen of the United States, residing at Naugatuck, county of New Haven, and State of Connecticut, have invented certain new and useful Improvements in Processes of Reclaiming Rubber, of which the following is a full, clear, and exact description.

My invention relates to the recovery of rubber waste, particularly that in which fibrous material has been incorporated, such as rubber resulting from the manufacture of rubber shoes, clothing, hose, automobile tires, or any other rubber scrap containing fiber.

The object of my invention is to efficiently employ certain organic materials for the purpose of disintegrating the fiber, to utilize the cellulose and the rubber of the waste material, and to convert the foreign materials into a substance which will serve as an efficient filler for the reclaimed rubber product.

A further object of my invention is to eliminate the use of chemicals which have a deleterious action on the rubber itself, such as where strong acids are used.

In the practice of my invention, I prefer to proceed as follows, although I desire to be understood as not being limited to the precise details of the process herein set forth. The rubber waste or scrap containing cotton fibers is reduced to a pulverized state, then the mass, without separation of the cellulose from the rubber, is thoroughly mixed with a substance which consists of one or more of those organic materials which are capable of undergoing degradation by decomposition, such as by hydrolysis, and produce organic acids, such as those known as amino-acids. In this form of my invention I prefer to use a substance containing nitrogen and whose decomposition products may contain the amino or $NH_2$ group, such as protein. Albumins, such as egg or blood albumin, may be used, or a protein in the form of casein. These substances are easily decomposed and form organic acids or those known as amino-acids, which act on the cellulose and disintegrate the same.

While the scrap material is being mixed with the casein or other protein, water if necessary, to promote hydrolysis, and any of the usual softening substances now employed in the practice of reclaiming, may be added. The mass is placed in a devulcanizer and treated with steam under a pressure of, preferably, about 135 lbs.

As an example of one specific use of a protein in the reclaiming of rubber, I have successfully used the following proportions:

Pulverized tire casings _____ 100 parts
Albuminoid (common glue) _____ 10 "
Cylinder oil _____ 10 "
Water _____ 10 "

This mixture is heated in a devulcanizer from 15 to 20 hours at a steam pressure of approximately 135 lbs. of saturated steam by which a temperature of approximately 358° F. is obtained.

The treatment involving the devulcanization alters the cellulose fiber of the rubber waste, converting it into a brittle, dark brown substance which is easily pulverized by the slightest mechanical kneading or pressure. The added ingredient also undergoes a similar disintegration, and at the same time I find that the rubber itself is materially softened and improved so that it may be worked to advantage in subsequent steps in utilizing the same. After devulcanization the stock may be washed, if desired, or if it is not necessary, it is dried to remove any excess moisture present therein. The product is then worked or mixed so that it is homogeneous and is thereafter in a condition to be utilized as reclaimed rubber of excellent quality.

Instead of using the substances named in substantially pure condition, I may use any or all of the products or materials from which they are derived, or any of the vegetable or animal products containing protein. I have found that milk casein and ox blood and other similar raw materials, or any similar by-products used in any of the industries relating to the same, will serve with good results.

Certain seeds, nuts and grains, such as wheat, barley and lentils, containing carbohydrates in the form of starch or other saccharoses, as well as proteins in the form of albumins: these may be utilized to obtain the hydrolyzing action of the carbohydrate in addition to the disintegrating effect of the protein. The use of carbohydrates for this purpose has been made the subject of a separate application filed by me on October 8, 1915 Serial No. 54,901.

This improved method of treating rubber has many advantages over the present methods used, among which is the fact that the cellulose, as well as the materials added, is changed to a substance which serves as an efficient filling material and thereby avoids those steps for the removal of the fiber and foreign materials by washing, or by any other of the present well known methods. It may be successfully used in place of the present well known sulfuric acid process for reclaiming, since, besides the previously mentioned advantages, this process avoids the formation of calcium sulfate, which almost invariably occurs by the sulfuric acid process and the presence of which is not at all desirable in the finished stock.

In practice I find it necessary to use the added materials, such as albumin, etc., in amount depending wholly upon the amount of fibers present, and therefore do not wish to be limited to any specific proportion. In general, when reclaiming rubber, I find that the substance used in amounts of about 10 to 20 per cent. of the weight of rubber waste, is sufficient, but the amount may be varied to more or less per cent. without any serious detrimental results.

What I claim and desire to protect by Letters Patent is:

1. In a process for the disintegration of fibrous cellular material, the treating of such material with a protein in the presence of heat.

2. In a process for the disintegration of fibrous cellular material, the treating of such material with a protein in the form of an albumin in the presence of heat.

3. In the process for the disintegration of fibrous cellular material, the treating of such material with a natural organic product containing a protein in the presence of heat.

4. In the process of reclaiming rubber waste, the step of treating such waste with a protein.

5. In the process of reclaiming rubber waste, the step of treating such waste with a protein in the form of an albumin.

6. In the process of reclaiming rubber waste, the step of treating such waste with a natural organic product containing a protein.

7. A reclaimed rubber compound containing decomposition products of protein and cellulose.

8. A reclaimed rubber compound containing decomposition products of albumin and cellulose.

9. A reclaimed rubber compound containing decomposition products of albumin, natural organic matter and cellulose.

10. A reclaimed rubber compound containing decomposition products of albumin, carbohydrates and cellulose.

Signed at Naugatuck, Conn., this 30th day of July 1915.

HAROLD R. MURDOCK.